US008333855B2

(12) United States Patent
Kline

(10) Patent No.: US 8,333,855 B2
(45) Date of Patent: Dec. 18, 2012

(54) MONITORING ELECTRICAL CONTINUITY FOR ENVELOPE SEAL INTEGRITY

(75) Inventor: John Kline, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 483 days.

(21) Appl. No.: 12/629,275

(22) Filed: Dec. 2, 2009

(65) Prior Publication Data

US 2011/0126958 A1 Jun. 2, 2011

(51) Int. Cl.
*B32B 41/00* (2006.01)

(52) U.S. Cl. .................... 156/64; 156/272.2; 156/272.4; 156/273.7; 156/378; 156/379; 156/379.6; 156/379.7

(58) Field of Classification Search .................... 156/64, 156/272.2, 272.4, 273.7, 378, 379, 379.6, 156/379.7
See application file for complete search history.

(56) References Cited

U.S. PATENT DOCUMENTS 6,620,308 B2 * 9/2003 Gilbert .......................... 205/702
2007/0023884 A1 * 2/2007 Branzell et al. ............... 257/679

* cited by examiner

*Primary Examiner* — Katarzyna Wyrozebski Lee
*Assistant Examiner* — Joshel Rivera
(74) *Attorney, Agent, or Firm* — Brian A. Collins; Charles R. Malandra, Jr.; Steven J. Shapiro

(57) ABSTRACT

A method for producing an envelope having improved seal integrity, comprising the steps of (i) applying a first conductive material to the flap of the envelope in an first area corresponding to a first seal location between the flap and the body portion of the envelope and (ii) applying a second conductive material to the body portion of the envelope in a second area corresponding to a second seal location between the body portion and flap of the envelope, the first and second seal locations being selected such that an end of the first conductive material contacts an end of the second conductive material when the conductive materials are arranged in a substantially common plane. The method further comprises the steps of sealing the flap to the body portion by closing the flap onto the body portion of the envelope to cause the conductive materials to lie in the substantially common plane, and inspecting the sealing interface to determine whether the conductive materials exhibit a property of electrical continuity thereby confirming that a seal has been formed between the flap and body portion of the envelope. A system and article is also described for producing an envelope having improved seal integrity.

3 Claims, 7 Drawing Sheets

MONITORING ELECTRICAL CONTINUITY FOR ENVELOPE SEAL INTEGRITY

TECHNICAL FIELD

The present invention relates to a method for sealing mailpieces and, more particularly, to a new and useful method, system and article for producing a mailpiece envelope having improved seal integrity.

BACKGROUND OF THE INVENTION

Mailing creation systems such as, for example, a mailing machine or mailpiece inserter, often include various modules dedicated to automating a particular task in the fabrication of a mailpiece. For example, in a mailpiece inserter, an envelope is conveyed downstream utilizing a transport mechanism, such as rollers or a belt, to each of the modules. Such modules include, inter alia, (i) a singulating module for separating a stack of envelopes such that the envelopes are conveyed, one at a time, along the transport path, (ii) a folding module for folding mailpiece content material for subsequent insertion into the envelope, (iii) a chassis or insertion module where an envelope is opened and the folded content material is inserted into the envelope, (iv) a moistening/sealing module for wetting the flap sealant and closing the flap to the body of the envelope, (v) a weighing module for determining the weight for postage, and (vi) a metering module for printing the postage indicia based upon the weight and/or size of the envelope, i.e., applying evidence of postage to the mail piece. While these of some of the more commonly assembled modules, i.e., for both mailing machines and mailpiece inserters, it will be appreciated that the particular arrangement and/or need for specialty modules, will be dependent upon the needs of the user/customer.

Recently, the need for privacy has become increasingly important due to changes in the laws related to the disclosure of health-related medical information/medical records i.e., the Health Insurance Portability and Accountability Act (HIPAA) and the increased frequency of identity theft/fraud. As a result, those business entities responsible for mailing such information, e.g., health care providers, insurance companies and financial institutions, are seeking assurances that the mail produced by such automated equipment are properly sealed and, to the extent practicable, tamper resistance, e.g., a perpetrator cannot open and reseal an envelope without some evidence of the potentially fraudulent activity. Various methods and systems are employed for sealing envelopes, however, none currently exhibit the degree of seal integrity sought by those responsible for mailing such records/information.

Conventionally, sealing modules include a device for moistening the glue line on the flap of envelopes in preparation for sealing to the body of the envelopes. The moistening device typically includes an applicator such as a brush, foam or felt. A portion of the applicator may be disposed in a fluid reservoir to wick moistening fluid to the flap sealant. The moistening fluid is typically water, or water with a biocide to prevent bacteria from developing in the fluid reservoir of the module.

While these moistening devices and applicators are acceptable for most mail applications, there is no method or system to ensure that (i) the proper amount of moistening fluid has been applied (ii) the flap sealant has been wetted along the full length/width of the glue line or (iii) the flap and body have come into contact so as to produce a proper seal. Consequently, there is no assurance that the mailpiece has been sealed, i.e., there is no seal integrity.

Consequently, a need exists for a method, system and article which produces an envelope having improved seal integrity.

SUMMARY OF THE INVENTION

A method is provided for producing an envelope having improved seal integrity, comprising the steps of (i) applying a first conductive material to the flap of the envelope in an first area corresponding to a first seal location between the flap and the body portion of the envelope and (ii) applying a second conductive material to the body portion of the envelope in a second area corresponding to a second seal location between the body portion and flap of the envelope, the first and second seal locations being selected such that an end of the first conductive material contacts an end of the second conductive material when the conductive materials are arranged in a substantially common plane. The method further comprises the steps of sealing the flap to the body portion by closing the flap onto the body portion of the envelope to cause the conductive materials to lie in the substantially common plane, and inspecting the sealing interface to determine whether the conductive materials exhibit a property of electrical continuity thereby confirming that a seal has been formed between the flap and body portion of the envelope. A system and article is also described for producing an envelope having improved seal integrity.

BRIEF DESCRIPTION OF THE DRAWINGS

The accompanying drawings illustrate presently various embodiments of the invention, and assist in explaining the principles of the invention.

DETAILED DESCRIPTION OF AN EMBODIMENT OF THE INVENTION

Figure 1:
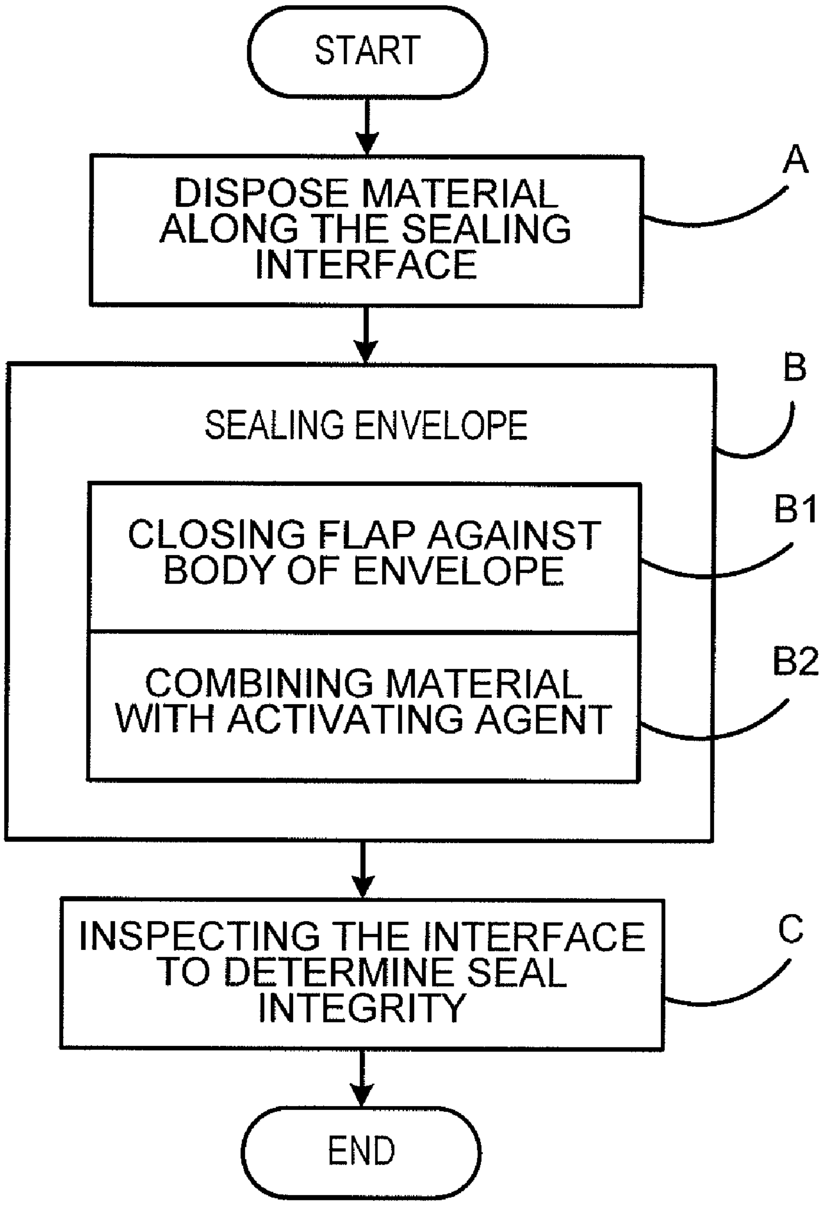
FIG. 1 depicts a block diagram of the method steps employed for producing a mailpiece having improved seal integrity according to the present invention.

The method, system and article for producing an envelop having improved seal integrity will be described in the context of a mailpiece insertion system. Although, it should be appreciated that the description is merely illustrative of a typical embodiment and that the invention is applicable to any mailpiece creation system. In one embodiment of the invention, seal integrity is confirmed by examining optical/visual changes which occur when one or more materials are chemically combined or activated. More specifically, a strip, or a predetermined pattern, of at least one material is disposed on at least one of the flap and body portion of an envelope and chemically combined/activated by another material/agent to produce a measurable result/reaction.

Relying on this method, i.e., as evidence that a seal has been formed, requires that an assumption be made concerning the combination/activation of the strip/pattern of material disposed in/proximal to the adhesive sealant. That is, it is assumed that a seal is formed when a material is activated, or combined with another material, to generate predictable, measurable and/or visible results. As a result of the flow of material, or changes in state by activating/combining the material with another material (e.g., a developer/activating agent), an assumption can be made concerning the integrity of the seal. That is, if the material has mixed with another material, or been activated so as to transition to another form/state, then the adhesive, in/around the activated material/combined materials, has also been adequately combined to develop a seal. Hence, the material along the sealing interface can be viewed as providing evidence that another operation/process, i.e., sealing, has occurred.

In another embodiment, seal integrity is confirmed by examining the thermal effects due to the reaction of the material with the activating agent. Inasmuch as all chemical reactions are either exothermic (i.e., heat releasing) or endothermic (i.e., heat absorbing), the heat energy released/absorbed may be detected by an InfraRed (IR) sensor. In one embodiment of the method, a material, which releases heat in the presence of an aqueous solution, is disposed on the body portion of the envelope. The sealing strip along the flap of the envelope is moistened by the sealing module and closed against the body portion such that an exothermic reaction occurs when the moistening liquid contacts the material. An IR sensor, disposed downstream of the sealing module, senses the release of thermal energy and compares the difference to other portions of the same envelope, or to a standard acceptance pattern/thermal image of the envelope. Should the difference in temperature exceed a threshold value, it can be assumed that the sealing interface has been moistened along the length of the sealing strip (or, minimally at critical locations along the length) and that the efficacy of the adhesive seal is within acceptable margins.

In yet another embodiment, seal integrity is confirmed by examining traces of a conductive wire or material disposed in or around the sealant strips. Once again, the sealant strips are disposed along the sealing interface e.g., on one or both of the flap and body portion of an envelope. This method also relies on a similar assumption that when the wires are coupled, or combined, to produce an output signal, the neighboring sealant material must form a positive seal to sustain a constant/uniform output signal. Hence, the conductive traces provide evidence that a seal has occurred.

Figure 2:
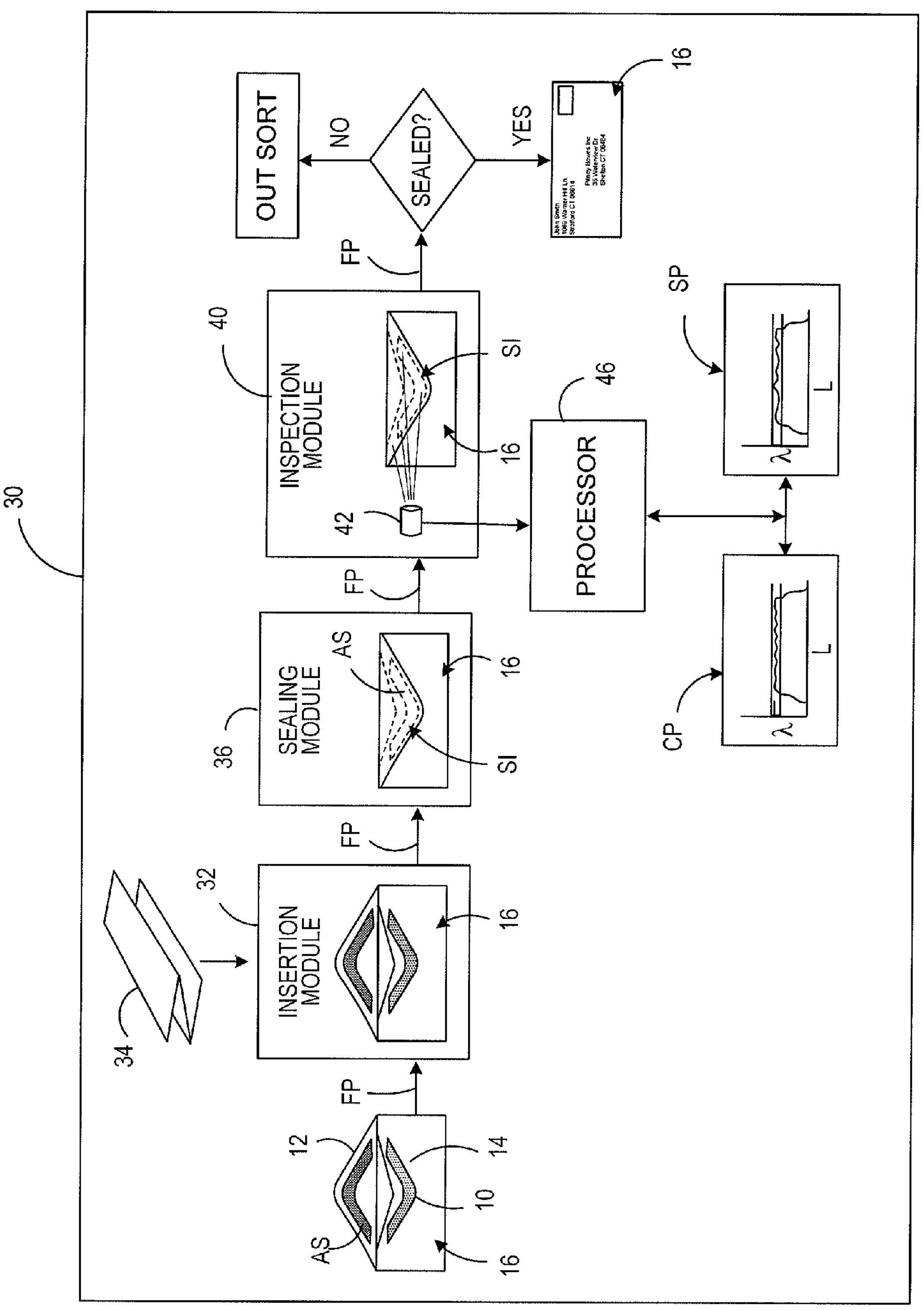
FIG. 2 is a schematic illustration of a mailpiece fabrication system incorporating the teachings of the present invention wherein a sealing module causes an activating agent to react with a material disposed along the sealing interface of an envelope and wherein a detection/inspection module examines the sealing interface for a change in color produced by the material.

In the broadest sense of the invention and referring to FIGS. 1 and 2, step A of the inventive method incorporates at least one material 10 at the interface IF of the adhesive seal, i.e., between the flap 12 and the body portion 14 of an envelope 16, which exhibits a characteristic property when combined with an activating agent. In the context used herein, the phrase “combined with an activating agent” means any method/mechanism for activating the material such that the characteristic property is exhibited. “Activating agent” means any agent, developer, or catalyst which combines with the material to effect a chemical or physical reaction/transformation. Examples include: (i) wetting/moistening the material to change the state of the material, (ii) introducing oxygen into the material to effect an exothermic or endothermic reaction, or (iii) adding a catalyst to the material to expedite a chemical reaction. A “characteristic property” of the material means any physical attribute of the material which can be sensed by a detection apparatus such as a color scanning device, spectrometer, thermometer, IR sensor, radiation detectors, magnetometers.

The envelope 16 is sealed by closing the flap 12 onto the body portion 14 of the envelope 16 in a Step B1, and admixed, combined, or exposed to, the activating agent at the sealing interface SI in a Step B2. In a step C, the interface SI is visually inspected to determine whether the material 10 exhibits the characteristic property, i.e., providing evidence that a seal has been formed between the flap 12 and body portion 14 of the envelope 16. The sealing interface SI may be inspected or examined to determine whether the characteristic property is uniformly exhibited along the entire sealing interface SI or at discrete locations therealong. Such examination may be performed by sensing the characteristic property and comparing the same to a known or standard acceptance pattern, i.e., stored in a database of a memory storage device. These features will be understood when describing the invention in the context of a mailpiece creation system (discussed in subsequent paragraphs).

In the described embodiment, the material 10 may or may not have adhesive properties but exhibit a unique characteristic property, e.g., a property which may be visually determined or confirmed, when combined or admixed with the activating agent. The material 10 may be (i) extend the full length of the mailpiece envelope 16, i.e., following the edge contour of the flap 12 and body portion 14 of the envelope 16, (ii) be placed at various locations, e.g., at points along the flap 12 and body portion 14 to confirm the seal integrity at discrete locations, or (iii) be arranged in some combination of (i) and (ii) above to provide the necessary information concerning seal integrity. As mentioned above, may or may not have adhesive properties and may function as a tracer to provide evidence that a seal has been formed. The activating agent may be a liquid, or a solid which is caused to flow like a liquid by a moistening liquid such as an EZ-seal® moistening fluid (EZ-seal is a registered trademark of Pitney Bowes Inc. located in Stamford, Conn.).

Steps A through D above may be performed by a mailpiece creation system 30, schematically depicted in FIG. 2. More specifically, the mailpiece envelope 16 is fed along a feed path FP to various modules including an insertion/chassis module 32 where content material 34 is inserted into the pocket of the envelope 16. A folding module (not shown) may have folded the content material 34 before insertion into the envelope 16. Thereafter, the filled envelope 16 is conveyed to a sealing module 36 where various operations to deliver or apply an activating agent to the material along one of the flap 12 and body portions 14 of the envelope.

The material 10 may be pre-applied in a solid form along one side of the sealing interface SI, i.e., along the side of the flap 12 or the side of the body portion 14 of the envelope 16. Thereafter, the sealing module 36 employs one or more applicators or spray nozzles to apply a moistening liquid/activating agent to the opposing side of the sealing interface SI. As such, when the sealing module 36 closes the flap 12 onto the body portion 14, the moistening liquid/activating agent contacts, combines and activates the material 10. Alternatively, the material 10 and moistening liquid/activating agent may be applied along the sealing interface SI in a liquid state by the sealing module 36. That is, the material 10 may be applied to the body portion 14 of the envelope 16 while the moistening fluid/activating agent is applied to the flap 12 of the envelope, i.e., over or proximal to the adhesive sealant AS or glue line of the flap 12. Once again, when the sealing module 36 closes the flap 12 onto the body portion 14, the moistening liquid/activating agent combines and activates the material 10.

Once the mailpiece envelope 16 is filled and sealed, the envelope 16 travels to the inspection module 40 where an inspection of the sealing interface SI is performed. The inspection module 40 includes a non-contact sensing device 42 which is operative to provide a condition signal indicative of a characteristic property pattern 44 (shown graphically in FIG. 2) exhibited by the material 10 along the sealing interface SI. In the context used herein, a "non-contact sensing device" is any detection device which does not require that the sealing interface be touched, probed, separated or lifted to provide evidence that a seal has been formed. Furthermore, a "characteristic property pattern" means the electrical (i.e., digital or analog) representation of the sensed characteristic property along the sealing interface SI. For example, if the sealing interface SI has changed from the color blue to the color pink along the entire length of the sealing interface SI, then the sensing device 42 issues a condition signal indicating that reflected light is within a particular band of wavelength, e.g., the color pink, and spans a particular portion of the sealing interface SI. Devices useful for detecting color include scanning devices capable for distinguishing between multiple wavelengths/bands of light. These include narrow-band wavelength detectors such as TSL257 series from TAOS Inc, Plano Tex., multiple band wavelength detectors such as TCS230, TCS3404, or TCS3414 also from TAOS Inc., Plano Tex., spectrophotometers such as TeleFlash130, Teleflash 445, VeriColor Solo and Vericolor Spectro from X-Rite Inc., Grand Rapids, Mich. Other inspection monitoring systems such as electrical continuity monitors 50 are envisioned to detect whether the sealing interface is continuous. These are discussed in greater detail when describing FIGS. 7A and 7B.

A processor 46 develops the sensed characteristic property pattern CP from the condition signal and compares it to a known acceptance standard pattern SP which has been created and stored in a memory device (not shown). The acceptance standard pattern SP provides a baseline for an acceptable seal and may include some margin for variance/deviation beyond the baseline. If the characteristic property pattern CP is equivalent to, or within the margins of, the acceptance standard pattern SP, then the seal integrity is deemed acceptable and processing continues, i.e., the mailpiece is weighed and franked, until the mailpiece is complete. If, however, the characteristic property pattern CP and acceptance standard patterns SP are disparate/incongruous, then the mailpiece envelope 16 may be out-sorted due to a seal deficiency.

Various experiments and tests where performed to demonstrate practical applications of the inventive method. A description of each will provide an understanding of the various approaches/methods which can be used to provide the requisite seal integrity evidence. Each will be described in terms of the characteristic property exhibited and inspected.

Characteristic Property—Color Change—Dyes/Dye Developers

Figure 3A:
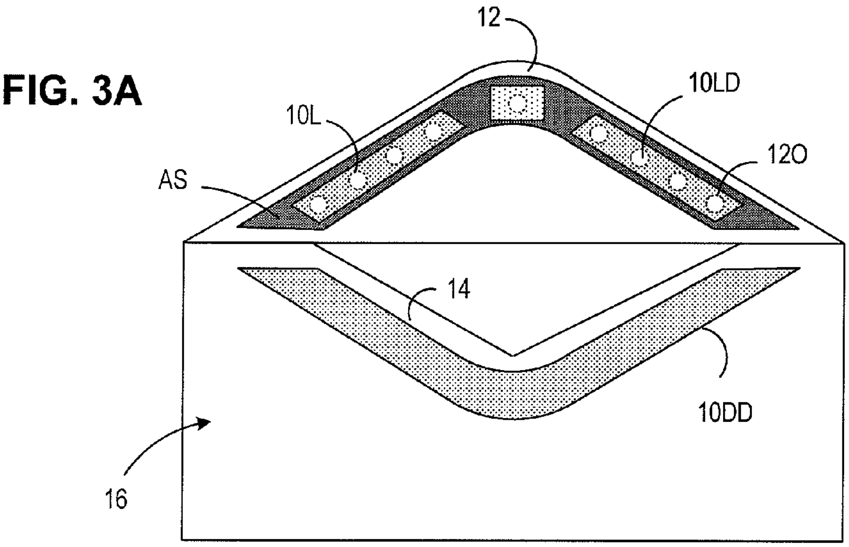
FIG. 3A depicts one embodiment of the present invention wherein the method includes the steps of disposing a leuco dye material on one side of the sealing interface, i.e., along the flap of the envelope and a dye developer on the other side of the sealing interface, i.e., along the body portion of the envelope so as to produce a change in color when combined in the presence of a moistening fluid.
Figure 3B:
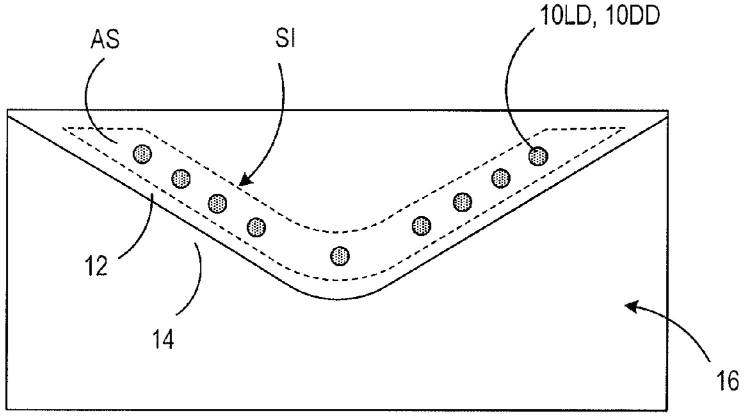
FIG. 3B depicts the envelope of FIG. 3A in a sealed condition and a translucent window for viewing changes in color when the leuco dye and dye developer react.

In a first experiment, dyes/dye developers where employed along the sealing interface SI to provide evidence of seal integrity. In FIGS. 3*a* and 3*b*, a leuco dye 10LD was incorporated along the sealing interface SI or, more precisely, along the flap 12 of the envelope 16. Furthermore, a dye developer 10DD was incorporated along the opposing side of the sealing interface SI, or along the body portion 14 of the envelope 16. Additionally, the envelope 16 was modified to include a plurality of openings 12O covered by a translucent or transparent window 12W. These windows 12W are similar to a conventional transparent envelope windows employed for viewing a destination or return address printed on the internal content material of a mailpiece. The openings 12O were relatively small, i.e., smaller than the width of the adhesive sealant AS, and may be circular or oval in shape, thus allowing the sealant AS to circumscribe/surround the openings 12O.

In the test performed, a first material i.e., the leuco dye 10LD, was applied to a transparent plastic material which was subsequently bonded over apertures disposed through an existing sealant strip of a conventional mailpiece envelope. The dye-coated plastic material, therefore, produced windows 12W in and about the sealant strip AS. A second material, or the dye developer 10DD was also applied to the body 14 of the envelope 16. The leuco dye 10LD and dye developer 10DD were initially clear or colorless.

The flap 12 of the envelope 16 was exposed to an aqueous solution of EZ-seal moistening liquid and closed onto the body portion 14 of the envelope 16. In the presence of the moistening liquid, both the leuco dye 10LD and dye developer 10DD began to flow and combined. Furthermore, the leuco dye 10LD and dye developer 10DD combined to produce a dark violet color. While the color change may be viewable by a variety of methods, e.g., backlighting the envelope to view a change in contrast through the envelope, the color change exhibited by the combined dye and dye developer 10LD, 10DD were clearly viewable through the transparent window 12W.

Leuco dye classes which may be used include: fluorans, spiropyrans, quinones, thiazines, oxazines, phenazines, phthaides, triarylamines, tetrazolium salts, etc. In the described embodiment, the leuco dye material was a crystal violet lactone and the dye developer was a Bisphenol A. While these materials, when combined, exhibit a characteristic property of the color "purple", other dyes and dye developers may be used to produce viewable color changes. Table I below provides a list of dyes and dye developers which may be used to produce characteristic properties which may be sensed by a non-contact sensing device, i.e., a conventional color scanning apparatus. The dyes may be used with any of the dye developers and the selection of one or another depends on a variety of factors including cost, availability, reaction time, etc.

TABLE I

| DYE | DYE DEVELOPER |
|---|---|
| 2'-anilino-6'-diethylamino-3'-methylfluoran | Benzyl Paraben |
| 3,3-bis(p-dimethylaminopheyl)-6-dimethylaminophthalide | p-hydroxy benzoic acid |
| 3,3-bis(4-dimethylaminopheyl)-phthalide | Benzyl ester |
| Malachite Green Lactone | Zinc salicylate |

Characteristic Property—Color Change—Water Sensitive Materials

Figure 4A:
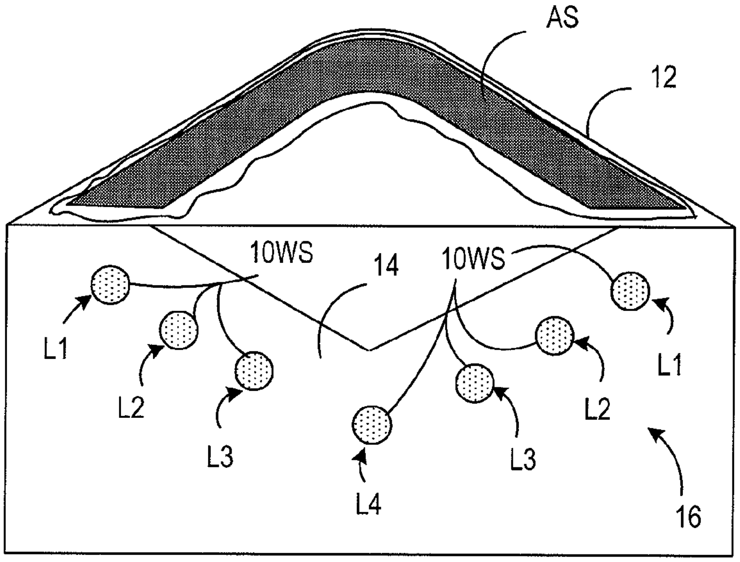
FIG. 4A depicts another embodiment of the present invention wherein the method includes the steps of depositing a color sensitive material along the body portion of the envelope, the color sensitive material changing color in the presence of an aqueous liquid, and wetting the color sensitive material by moistening the flap of the envelope and closing the flap against body of the envelope.
Figure 4B:
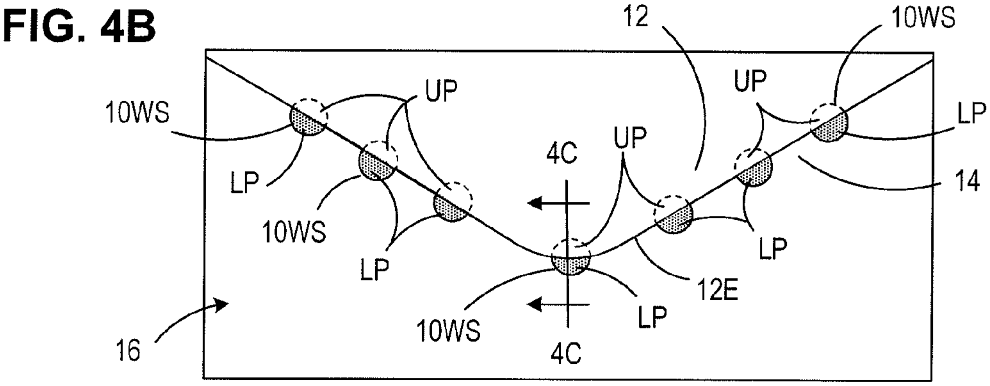
FIG. 4B depicts the envelope of FIG. 4A in a sealed condition wherein the moistening fluid wicks into the color sensitive material which extends below the edge of the flap (i.e., in its sealed position against the body) for examination by the detection/inspection module.
Figure 4C:
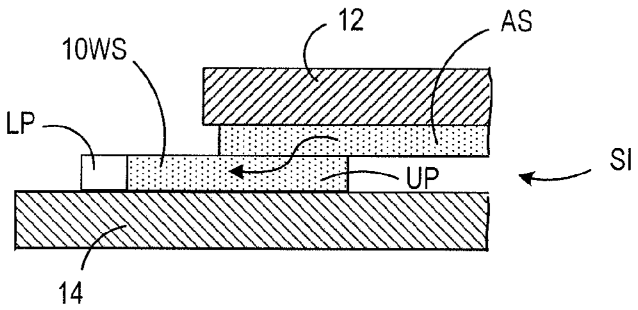
FIG. 4C depicts a cross-sectional view taken substantially along line 4C-4C of FIG. 4B for illustrating the wicking action of the color sensitive material to facilitate examination of the detection/inspection module.

In another experiment and referring to FIGS. 4*a*, 4*b* and 4*c*, a water sensitive material, e.g., a moisture indicator, was deposited at discrete locations L1, L2, L3, and L4 along the body portion 14 of an envelope 16. In this embodiment, the water sensitive material changes color, e.g., from a blue color to a pink color, in the presence of water or any aqueous solution. While the previous embodiment of the invention, relating to the use of a dye and dye developer, employed a translucent/transparent window to facilitate viewing by a color scanning device 46 (FIG. 2), in this embodiment, at least a portion LP of the material 10WS is deposited below the edge 12E of the flap 12 such that the color change can be viewed directly (a feature which will be discussed in the subsequent paragraph).

According to the experiment performed, circular deposits 10WS of cobalt chloride were equally spaced along and arranged to follow the V-shaped edge contour of the flap 12. Furthermore, a first portion LP of the cobalt chloride was deposited to extend below the flap edge 12E. A color change, i.e., from blue to pink, was effected by moistening the adhesive sealant AS along the flap 12 and closing the flap 12 onto the body 14 of the envelope 16 such that the moistening fluid MF (see FIGS. 4*b* and 4*c*) contacted a second portion UP of each circular deposit 10WS, i.e., the portion UP disposed under the flap 12. Inasmuch as the cobalt chloride is highly absorptive, the moistening fluid wicked into the material 10WS and into the first portion LP of each circular deposit 10WS. As a result, the color change, i.e., from blue to pink, was viewable and could be sensed by conventional color scanning apparatus.

While a ten percent (10%) solution of cobalt chloride was used in the experiments performed, it may be desirable to include stabilizing agents to the material 10WS to increase its shelf-life and prevent premature activation. That is, to prevent moisture from the ambient environment from activating the material 10WS, it may be desirable to admix the material with a solution of polyvinyl alcohol. A solution of about seventy percent (70%) cobalt chloride and thirty percent (30%) polyvinyl alcohol should prevent premature activation.

Table II below provides a list of moisture indicators which may be used to produce the characteristic properties which may be sensed by a conventional color scanning apparatus.

TABLE II

| Indicator | Color |
|---|---|
| Copper(II) Chloride | Brown to Light Blue |
| Porphyrin/$MgCl_2$ | Green to Purple |

Characteristic Property—Color Change—Variable pH

In another embodiment of the invention, the pH values of the envelope and the adhesive sealant may be selectively combined to produce a visible change in color at the sealing interface. In this embodiment, an envelop having a first pH value is selected, i.e., the pH value of the matrix which binds the fibrous material of the envelope, for combination with an adhesive sealant having a second pH value. By selecting combining these values such that they differ by some a threshold value a visible change in color can be detected. The difference in pH is greater than about 0.5, and preferably greater than about 0.7.

More specifically, when a moistening fluid is introduced onto the flap of the envelope and the flap is closed against the body portion of the envelope, the material or binding matrix within the envelope, i.e., having one pH value, is brought into contact the adhesive sealant, i.e., having another pH value. As a result of the difference in pH values i.e., between the adhesive sealant and the envelope produces a visible change in color at the sealing interface.

Table III is a list of acid base indicators are suitable for the detection of envelope sealing:

TABLE III

| Name | Acid Color | Base Color |
|---|---|---|
| Azolitman | Red (pH < 5.0) | Blue (pH > 7.5) |
| Bromocreosol Purple | Yellow (pH < 5.2) | Purple (pH > 6.8) |
| Brilliant Yellow | Yellow (pH < 6.5) | Orange (pH > 7.5) |
| Bromothymol Blue | Yellow (pH < 6.0) | Blue (pH > 7.5) |
| Phenol Red | Yellow (pH < 6.5) | Red (pH > 7.2) |
| Metacreosol Purple | Yellow (pH < 7.0) | Purple (pH > 7.8) |

Characteristic Property—Temperature Change

Figure 5A:
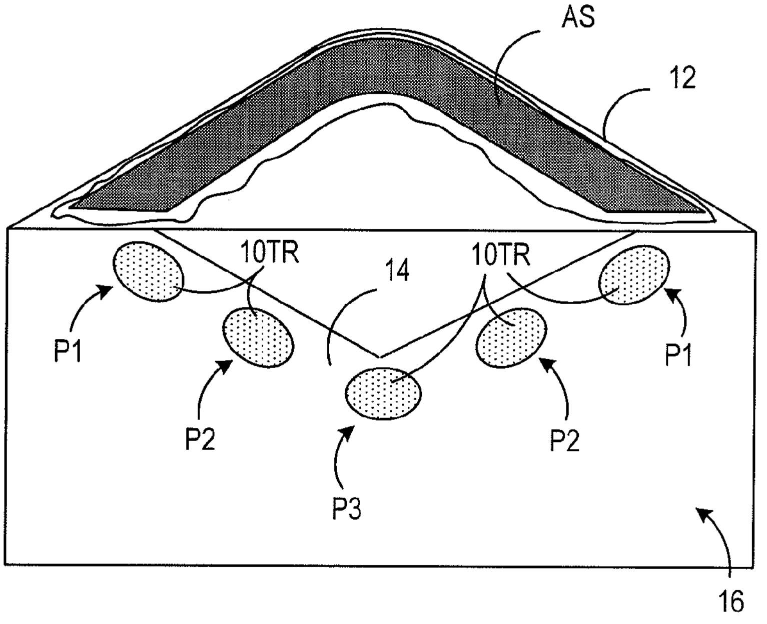
FIG. 5A depicts another embodiment of the present invention wherein the method includes the step of depositing a thermally reactive material along the body portion of the envelope such that thermal energy is radiated when the thermally reactive material combines with an activating agent e.g., such as by moistening and closing the flap against body of the envelope.
Figure 5B:
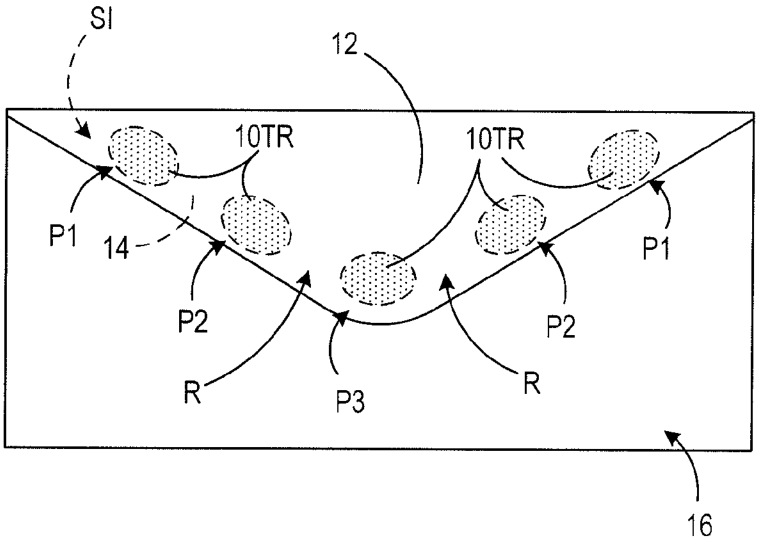
FIG. 5B depicts the envelope of FIG. 5A in a sealed condition wherein the activating agent causes the thermally reactive material to release/absorb energy which can be sensed by a detection device.

In yet another embodiment of the invention, seal integrity may be confirmed by inspecting the thermal effects at the sealing interface SI. In this embodiment, and referring to FIGS. 5*a* and 5*b*, any combination of materials 10TR which produces a thermal reaction may be used. For example, a material 10TR which reacts thermally in the presence of an aqueous solution may be employed. Alternatively, a material 10TR which reacts thermally in the presence of another material may also be used.

In this embodiment, a first material 10TR which is thermally reactive to an aqueous solution, is deposited at various known locations along the sealing interface SI. For example, a material 10TR containing a small concentration of sulfur or magnesium may be disposed on the body portion 14 of the envelope 16 in a location corresponding to the sealing interface SI. In the presence of water and, in particular, in the presence of the oxygen molecules therein, the material 10TR releases heat in an exothermic reaction. This heat energy, which manifests itself as a small rise in temperature, is the characteristic property exhibited by the material and may be detected by a conventional IR detector, i.e., the non-contact sensing device 46 shown in FIG. 2. Furthermore, inasmuch as a conventional paper-based envelope is essentially invisible to long-wavelength energy (i.e., in the IR spectrum), the flap 12, which is disposed over the sealing interface SI, does not block or inhibit the detection of the released energy. Should the difference in temperature exceed a threshold value, it can be assumed that the sealing interface has been moistened along the length of the sealing strip or, minimally at critical locations along the length (discussed in the subsequent paragraph) and that the efficacy of the adhesive seal is within acceptable margins.

To ensure that heat energy sensed is transmitted by the sealing interface SI and not as a result of variations in ambient conditions surrounding the envelope (e.g., heat generated by the mailpiece creation system 30), the material 10TR may be deposited at discrete locations along the interface SI. As a result, a comparison may be made between the heat released/temperature at each location and the heat released/temperature at locations between the deposited material 10TR.

Table IV is a list of various materials 10TR which may be used to produce a measurable change in the thermal signature produced along the sealing interface SI.

TABLE IV

| Reactive Material | Activating Agent |
|---|---|
| Calcium Oxide | Water |
| Calcium Chloride | Water |
| Potassium Permaginate | Glycerine |
| Fe/NaCl | Hydrogen Peroxide |

Characteristic Property—Electrical Continuity

Figure 6A:
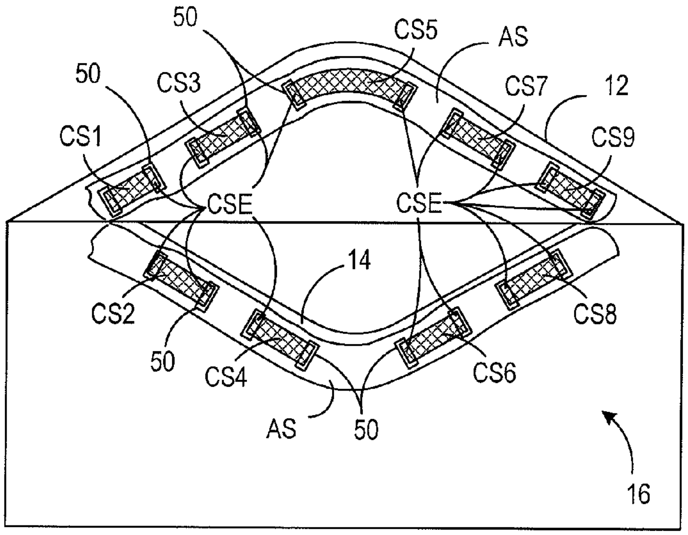
FIG. 6A depicts another embodiment of the invention wherein a plurality of conductive strips are disposed along the flap and body portions of an envelope in areas corresponding to the envelope seal which material provides a means to monitor electrical continuity across the seal when a reliable seal is effected.
Figure 6B:
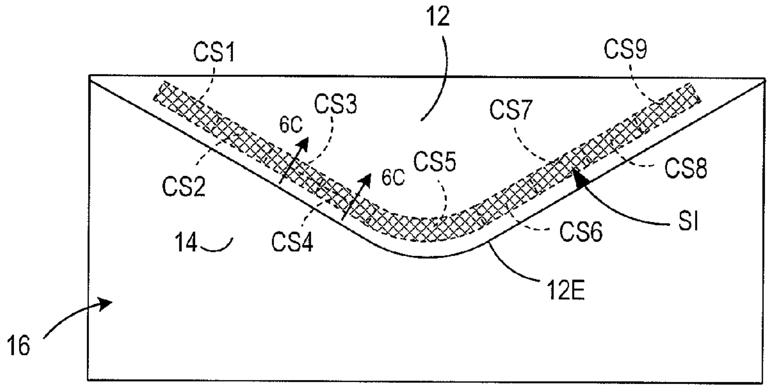
FIG. 6B depicts the envelope of FIG. 6B in a sealed condition wherein the edges of each conductive strip are in electrical contact and seal integrity may be examined by an electrical continuity monitor in the detection/inspection module.
Figure 6C:
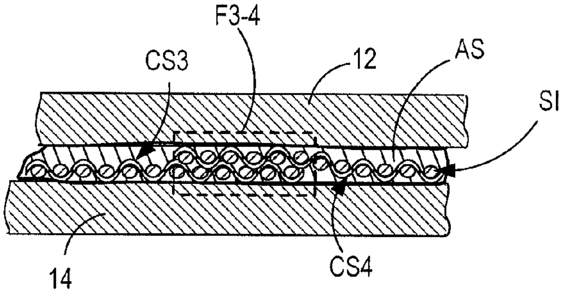
FIG. 6C depicts a cross-sectional view taken substantially along line 6C-6C of FIG. 6C illustrating the electrical contact between conductive strips.

In yet another embodiment and referring to FIGS. 6A-6C, seal integrity may be confirmed by examining traces of a conductive wire, wire mesh or other conductive material CS1-CS9 disposed in or around the adhesive AS. More specifically, in this embodiment, strips of conductive material CS1-CS9 may be disposed along the sealing interface SI in an alternating, overlapping pattern. That is, a first, third, fifth, seventh and ninth conductive strips CS1, CS3, CS5, CS7, CS9 may be placed along the flap 12 of the envelope 16 and a second, fourth, sixth, and eighth conductive strips CS2, CS4, CS6, CS8, may be placed along the body portion 14 of the envelope 16. The conductive strips CS1-CS9 are disposed in combination with sealant AB, however, the sealant material AB, i.e., an adhesive activated by an aqueous solution such as saliva, may be absent from areas 50 to prevent the sealant material AB from insulating the flow of current from one of the conductive strips CS1, CS3, CS5, CS7, CS9 to the other conductive strips CS2, CS4, CS6, CS8.

Figure 7A:
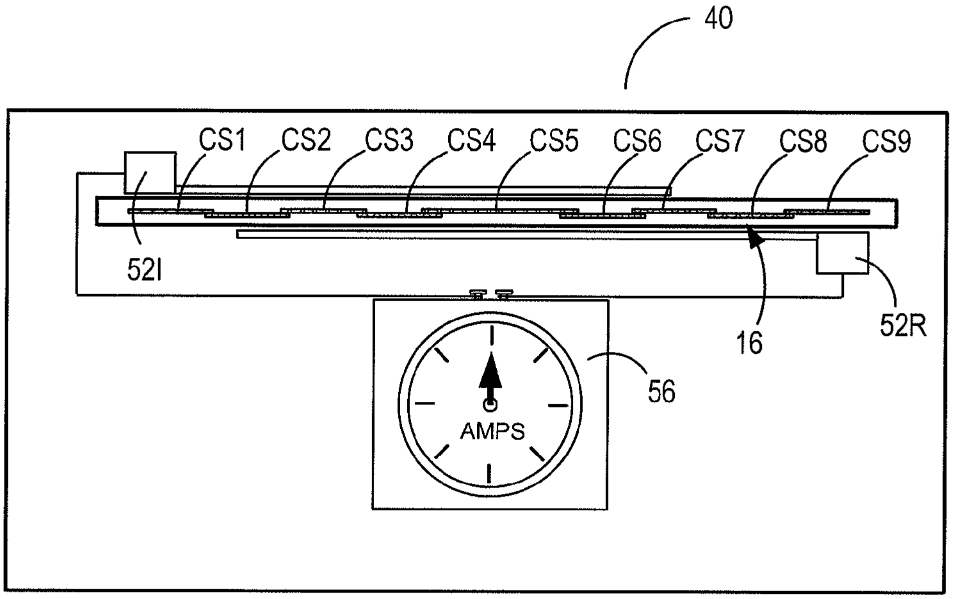
FIG. 7A depicts a schematic of one embodiment of the electrical continuity monitor illustrating a method to pass current across the seal to monitor seal integrity.

When the flap 12 is pressed into engagement with the body portion 14 of the envelope 16, along a substantially common plane, the edges CSE of the conductive strips CS1-CS9 are caused to overlap and make contact such that the strips CS1-CS9 form a single, continuous, conductive element along the sealing interface SI In FIG. 7A, the inspection module 40 of the present invention includes a means for passing a current through the sealing interface SI. That is, a current may be passed from one end of the interface SI via a first electrical/potential inducing contact 52I to a second electrical/potential receiving contact 52R. If the magnitude of the current measured by an ammeter 56 exceeds a threshold magnitude, then it can be concluded that a seal has been formed/produced across the sealing interface SI. That is, if the sealant AB has been properly wetted and sufficient contact made to maintain the edges of each conductive strip CS1-CS9 in mutual/positive contact, it can be assumed that the efficacy of the adhesive seal SI is within acceptable margins, i.e., that a reliable seal has been formed. If the magnitude of the measured current is lower than a threshold magnitude, e.g., an open circuit, then it can be concluded that a seal has not been properly formed and requires additional attention, e.g., repeat processing.

Should the envelope 16 be insulated such that passing a current through the sealing interface SI is difficult or problematic, it may be desirable to employ an RFID tag, in combination with the envelope, to receive, produce and pass electric current through the sealing interface SI. That is, an envelope 16 may include an RFID tag (not shown) disposed in electrical communication with the ends of the conductive strips CS1-CS9. The RFID tag may receive Radio Frequency energy from an external RF source, for conversion to electrical current. The electrical current produced by the RFID tag can be used to pass current through the sealing interface SI. If the sealing interface SI passes a threshold magnitude of current, the RFID tag may then be used to transmit information to an RFID reader concerning the efficacy of the sealing interface, i.e., whether or not a seal has been properly produced. Additionally, the RFID tag can be tuned to the resonance of the combined strips CS1-CS9, rather than a single one of the strips CS1-CS9. During inspection, the RFID tag can be interrogated to determine if the RFID tag responds. Depending upon the way the RFID tag is programmed, the tag can provide a means for communicating the status of the envelope seal, i.e., passing or defective.

Figure 7B:
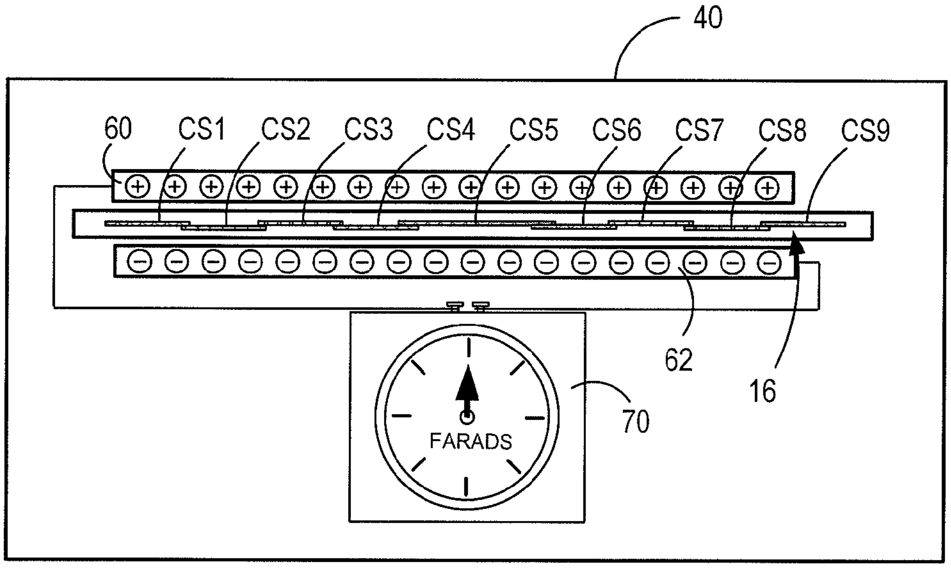
FIG. 7B depicts a schematic of another embodiment of the electrical continuity monitor illustrating a method to place the seal in a capacitance field to monitor seal integrity.

In another embodiment of the invention and referring to FIG. 7B, the envelope and sealing interface SI may be passed between electrically charged elements/plates 60, 62. That is, to determine whether the strips CS1-CS9 have produced a single conductive element, i.e., are closed, the outboard ends CSE of the conductive strips CS1-CS9, i.e., may be disposed over/passed across the electrically charged elements/plates 60, 62 to develop an electrical field therebetween. The electrical field may be measured by a conventional capacitance meter 70. Should the capacitive elements 60, 62 discharge or pass current across the conductive strips CS1-CS9, an assumption can be made that the circuit is closed and that a seal has been formed. Should the capacitance remain constant between the strips CS1-CS9, then no discharge has occurred nor current passed. An assumption can then be made that the circuit remains open and that the seal between the flap and body portion of the envelope is defective. Additionally, it is known that conductive materials such as the strips CS1-CS9, when disposed in an aqueous solution exhibits different capacitive properties than the same materials in a dry or non-aqueous solution. Hence, it can be expected when the strips CS1-CS9 are disposed, or suspended in, an aqueous solution, the combined strips CS1-CS9 will exhibit different capacitive properties than the same strips CS1-CS9 in a dry or non-aqueous solution. Hence, when the capacitance is measured and is within a threshold range of values, it can be concluded that the sealing interface SI has been wetted, and that an effective seal has been produced.

While the conductive strips CS1-CS9 are illustrated as strips imbedded within the adhesive seal AS, it should be appreciated that any means for providing conductivity in or around the adhesive sealant may be used. For example, conductive particles may be suspended within portions of the adhesive sealant material, i.e., along both sides of the sealing interface, or a wire mesh may be incorporated into the flap 12 and body portion 14 of the envelope 16.

Although the invention has been described with respect to a preferred embodiment thereof, it will be understood by those skilled in the art that the foregoing and various other changes, omissions and deviations in the form and detail thereof may be made without departing from the scope of this invention.

The invention claimed is:

1. A method for producing an envelope having improved seal integrity, the envelope having a flap and a body portion between which a seal is formed, the method comprising the steps of:

applying a first conductive material to the flap of the envelope in an first area between the flap and the body portion of the envelope;

applying a second conductive material to the body portion of the envelope in a second area between the body portion and flap of the envelope, the first and second areas being selected such that an end of the first conductive material contacts an end of the second conductive material when the conductive materials are arranged in a substantially common plane;

sealing the flap to the body portion by closing the flap onto the body portion of the envelope and causing the conductive materials to lie in the substantially common plane;

inspecting the sealing interface to determine whether the conductive materials exhibit a property of electrical continuity thereby confirming that a seal has been formed between the flap and body portion of the envelope, the step of inspecting the sealing interface including the steps of: (i) exposing the sealing interface to an electromagnetic field, and (ii) measuring the capacitance through the interface to determine whether the capacitance is between a threshold range of values indicative of a reliable seal.

2. The method according to claim 1 wherein the step of applying a first conductive material to the flap of the envelope includes providing a first plurality of conductive strips in spaced-apart relation along the sealing interface, wherein the step of applying a second conductive material to the body of the envelope includes providing a second plurality of conductive strips in spaced apart relation along the sealing interface, and wherein the edges of the first and second plurality overlap to produce a single conductive element along the sealing interface.

3. The method according to claim 1 further comprising the step of applying a sealant along the sealing interface of the flap and body portions of the envelope, and wherein the step of applying a sealant includes the step of applying the sealant to areas between the tip end portions of the first and second conductive materials to prevent the tip end portions from being insulated by the sealant when producing the sealing interface of the envelope.

* * * * *